Aug. 15, 1933.   J. SQUIRES   1,922,825
AIRPLANE
Filed Aug. 30, 1929   5 Sheets-Sheet 1
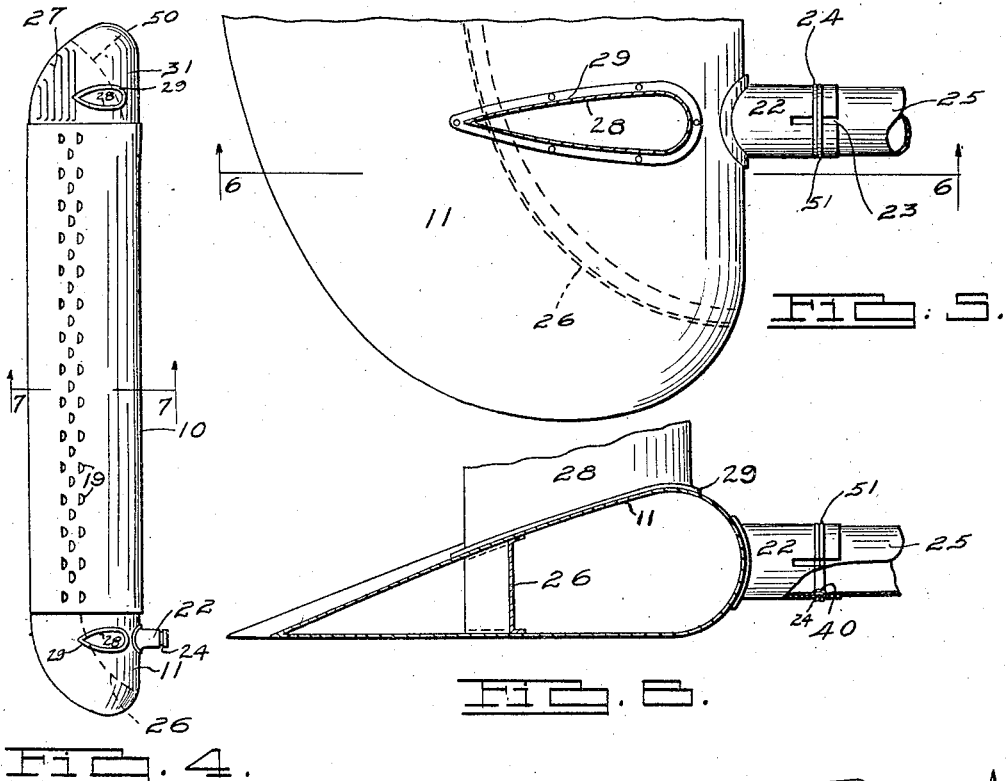
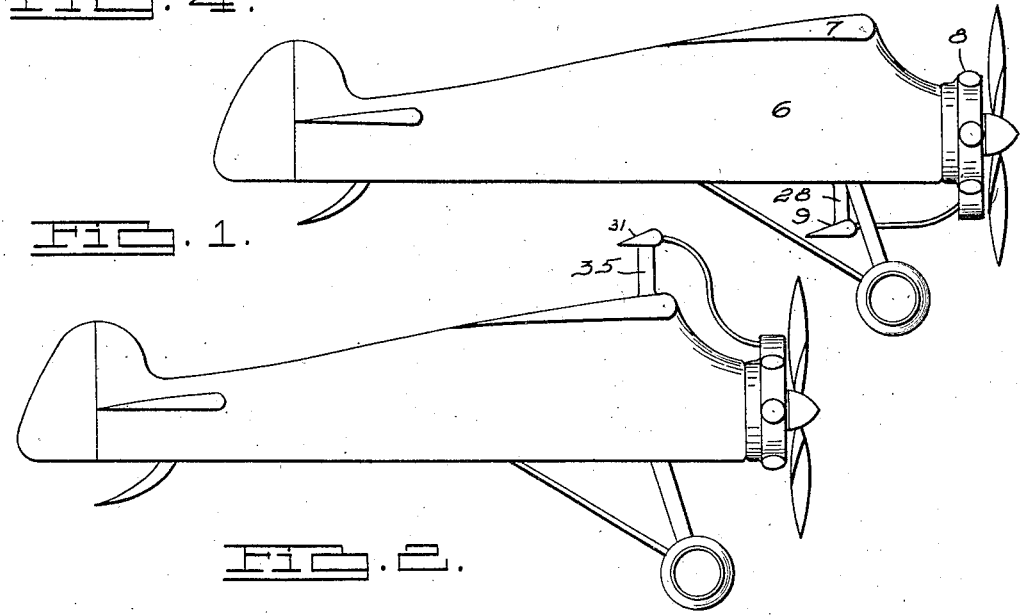
INVENTOR
John Squires
BY
Harness, Dickey & Pierce
ATTORNEYS Aug. 15, 1933.  J. SQUIRES  1,922,825
AIRPLANE
Filed Aug. 30, 1929     5 Sheets-Sheet 2
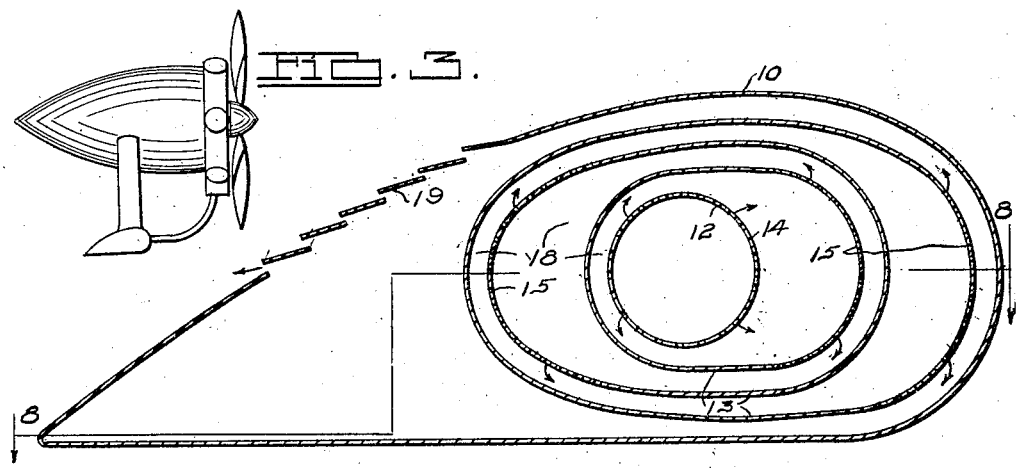
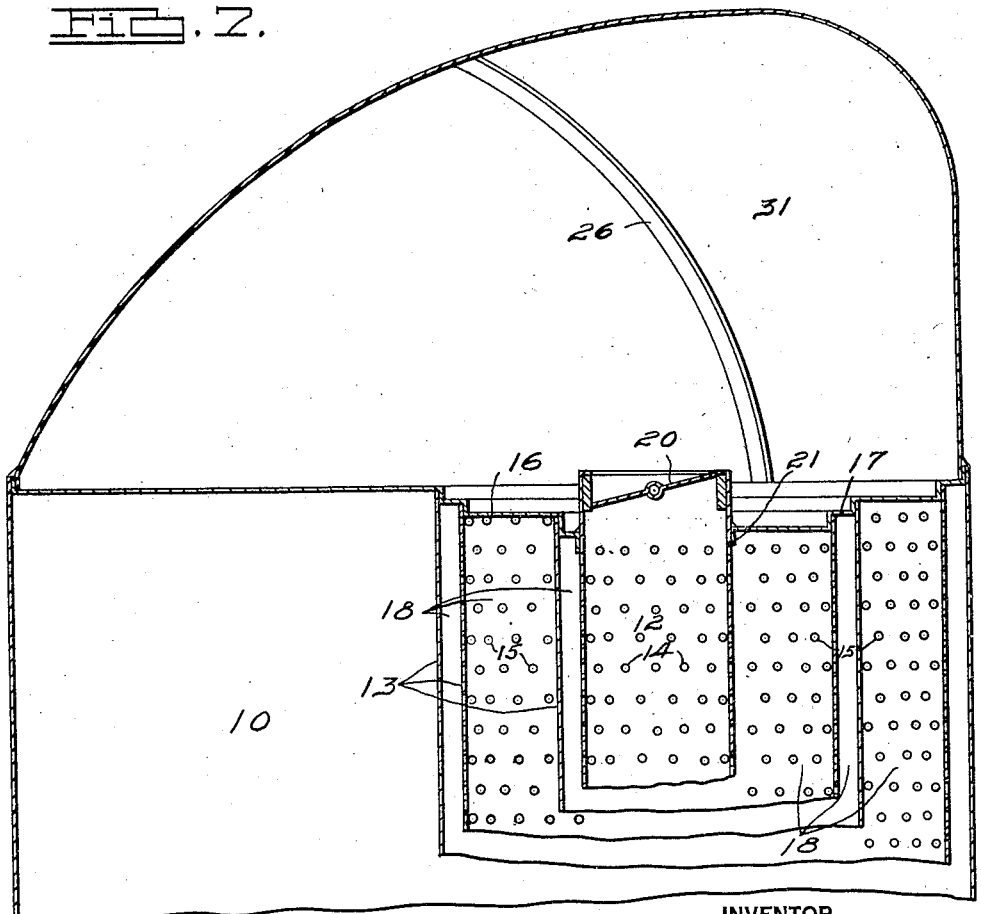
INVENTOR
John Squires.
BY
ATTORNEYS Aug. 15, 1933.  J. SQUIRES  1,922,825
AIRPLANE
Filed Aug. 30, 1929  5 Sheets-Sheet 3
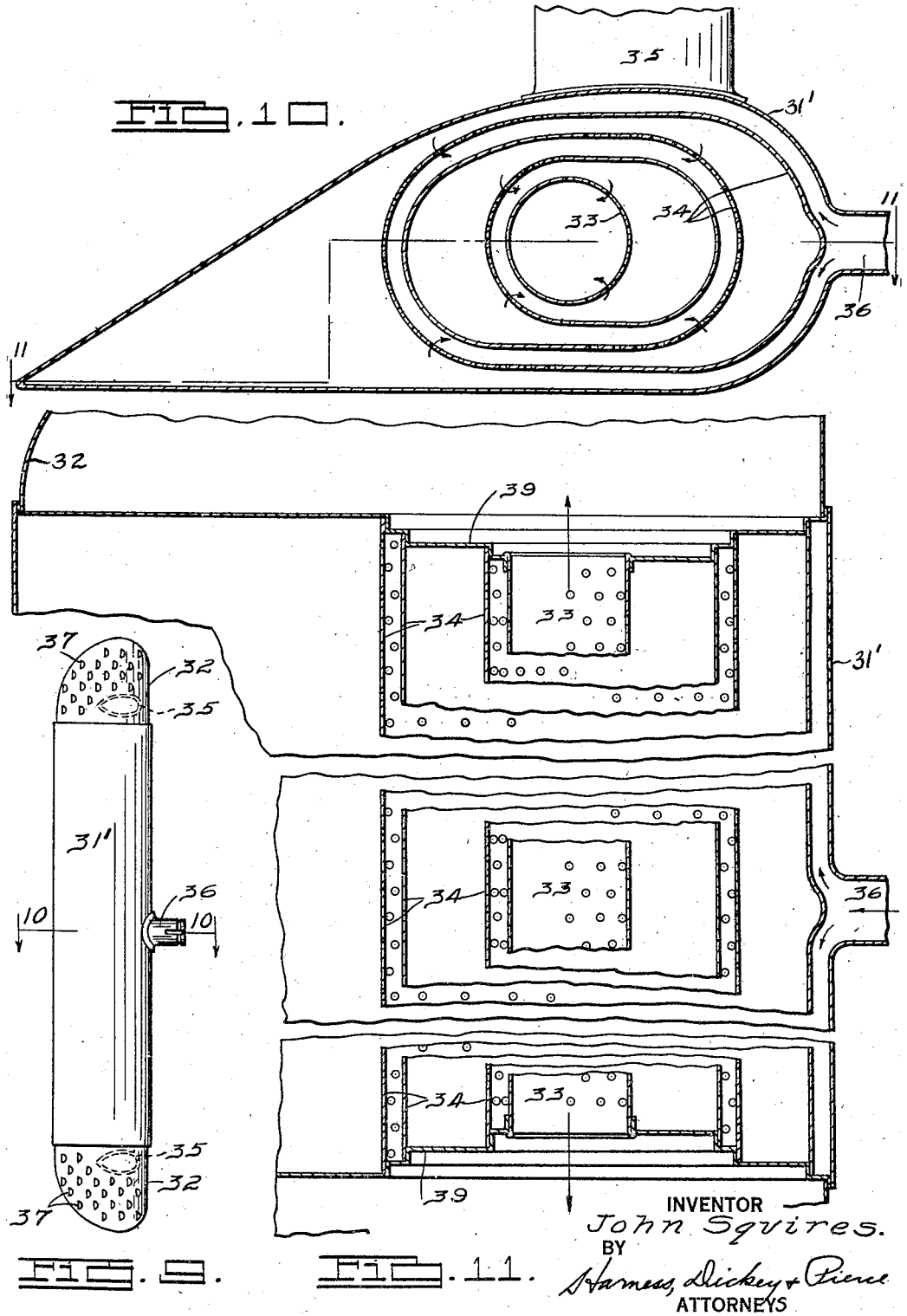

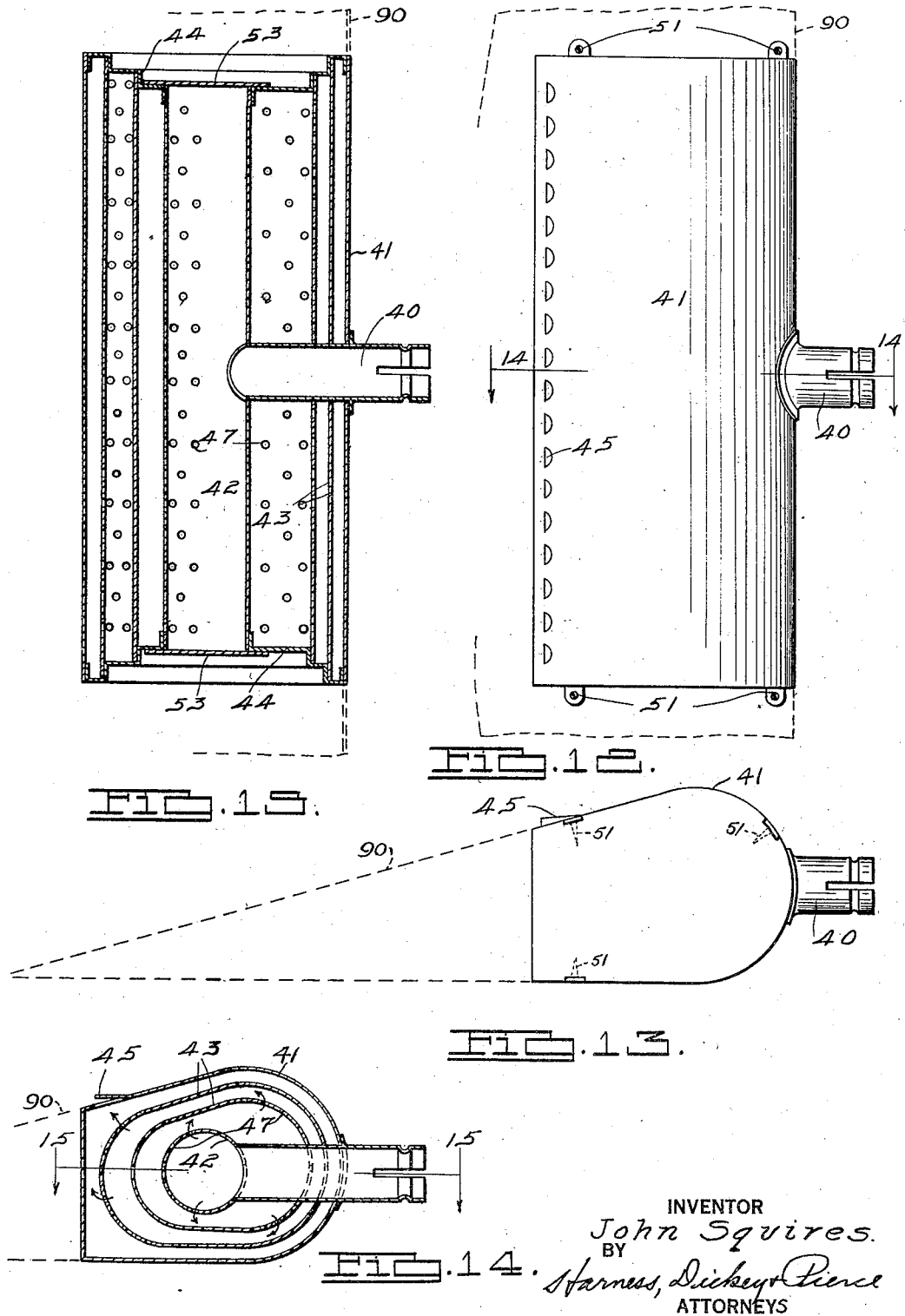

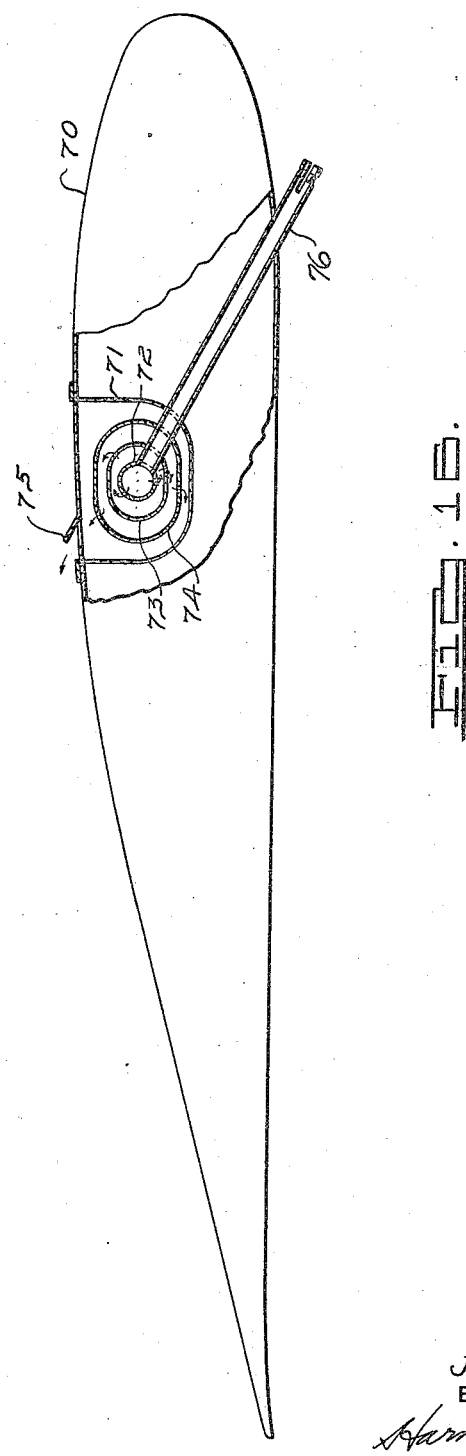

Patented Aug. 15, 1933

1,922,825

UNITED STATES PATENT OFFICE 1,922,825

AIRPLANE

John Squires, Hagerstown, Md.

Application August 30, 1929. Serial No. 389,551

17 Claims. (Cl. 244—31)

This invention relates to airplanes and particularly to a construction therefor that will result in more efficient operation thereof.

Another object is the provision of a means to silence the exhaust noises of an airplane engine.

Another object is the provision of a novel type of muffler for the engine of an airplane.

Another object is the provision of a means for reducing the back pressure on the exhaust of an airplane engine by utilization of the suction existing adjacent an airfoil.

Another object is the provision of a means for silencing the exhaust of an airplane engine with negligible horse power losses and parasitic resistance.

Another object is the provision of a means in an airplane to make the additional weight of an exhaust silencer perform a useful increment of the total lifting power of the aircraft.

Another object is to provide certain novel features of construction that will be specifically pointed out or will be obvious in the following specification.

The above being among the objects of the present invention, the same consists in certain novel features of construction and combination of parts to be hereinafter described with reference to the accompanying drawings, and then claimed, having the above and other objects in view.

In the accompanying drawings which show a suitable embodiment of the present invention, and in which like numerals refer to like parts throughout the several different views;

Fig. 1 is a side view of an airplane showing the installation of a silencer under the fuselage.

Fig. 2 is a side view of an airplane showing the installation of a silencer above the wing.

Fig. 3 is a side view of a nacelle of an airplane showing the installation of a silencer underneath the same.

Fig. 4 is a plan view of the silencer shown in Fig. 1.

Fig. 5 is an enlarged fragmentary plan view of the intake end portion of the silencer shown in Fig. 4.

Fig. 6 is a section taken on the line 6—6 of Fig. 5.

Fig. 7 is an enlarged sectional view taken on the line 7—7 of Fig. 4.

Fig. 8 is a fragmentary sectional view taken on the line 8—8 of Fig. 7 and illustrating the construction of the silencer at the end opposite to the intake end.

Fig. 9 is a plan view of the silencer shown in Fig. 2.

Fig. 10 is an enlarged sectional view taken on the line 10—10 of Fig. 9.

Fig. 11 is a fragmentary sectional view taken on the line 11—11 of Fig. 10.

Fig. 12 is a top view of a modified form of silencer embodied in the wing of an airplane.

Fig. 13 is an end view of the silencer in Fig. 12 showing in dotted lines the outline of a co-operating wing of airfoil section.

Fig. 14 is a section taken on the line 14—14 of Fig. 12.

Fig. 15 is a section taken on the line 15—15 of Fig. 14.

Fig. 16 is a more or less diagrammatic partially broken end view of the wing of an airplane, showing a modified form of mounting a silencer therein.

In the past it has been considered undesirable to attempt to silence the exhaust noise of aircraft engines, the additional weight of a silencer, its resistance, and the horse power loss being too great to allow its use. It is known that by the addition of smaller airfoil sections to the airplane wings or fuselage at the right incidence, the plane will tend to have a greater lifting power. I have taken advantage of this fact by embodying in an airfoil section a novel type of muffler to silence the exhaust noises of an airplane engine. By maintaining these airfoil sections at the proper incidence, the extra lifting force will tend to counter-balance the extra weight of the muffler. The only parasitic resistance is from the streamlined struts holding the structure to the wing or fuselage.

It is customary to manifold the exhaust from aircraft engines and run a tail pipe down and back under the fuselage so that no parasitic resistance can be charged to this design from such a source. In the device herein described and claimed I have provided a means for silencing the noise of the exhaust from an airplane engine and means to decrease the back pressure from the exhaust with negligible losses.

As illustrative of the present invention I have shown in the drawings, and particularly in Fig. 1, an airplane comprising a fuselage 6, oppositely extending wings 7, a motor 8, and a silencer 9 of airfoil section for the exhaust gases of the motor. The silencer 9 is secured on the underside of the fuselage 6 by streamlined struts 28 of such a length as to remove the silencer 9 from the zone of influence of wings 7 on the surrounding air so as to prevent the possibility of the silencer interfering with the lifting capacity of the wings.

As illustrated in Figs. 4 to 8 inclusive, the silencer comprises a main body portion 10 of airfoil section provided with end heads 16 which close the ends of the main body 10, and each head has an opening 21 to receive a preferably circular inner shell 12 positioned longitudinally of the main body 10 between the end heads 16. The shell 12 is provided with apertures 14 preferably extending completely around its circumference. The end heads 16 are flanged inwardly so as to receive and locate the ends of a plurality of shells 13 surrounding the inner shell 12 between the ends 11 and forming chambers 18 between them. The shells 12 and 13 are preferably secured to the end heads 16 by welding as at 17. The shells 13 are provided with apertures 15 positioned so as to cause the gas flowing from one of the chambers 18 to the next to flow along the longest path in order that more complete silencing of the gases will result. Louvres 19 are provided in the rear of the upper surface of the main body 10, where the suction effect usually occurs, to emit the silenced gases after passing through the chambers 18. Laterally extending streamlined end portions 11 and 31 are provided on the ends of the main body 10. Exhaust gas from the engine is fed into the end portion 11 through the inlet connection 22 provided therein and then flows into the shell 12. A curved baffle 26 is preferably provided in the interior of the end member 11 to better direct the gas into the shell 12. The gas thus flowing into the shell 12 escapes through the openings 14 to the chamber formed between the shell 12 and the innermost shell 13 and then escapes through the openings 15 in the innermost shell 13 to the next chamber, and in this manner passes from one chamber 18 to the next until it escapes from the main body 10 through the louvres 19. The inner shell 12 is larger in diameter than the inlet 22 and allows expansion of the gas and the lessening of its rate of flow. The inner shell 12 is provided with a relatively large number of holes, which causes diffusion of flow into the next chamber, breaking up the impulse impact of the original unit stream of gas into many small streams. The relation of the inner shell 12 to the nearest outer chamber 13 is such as to cause considerable variation in distance. The individual small streams of gas have to travel to the nearest exit resulting in an average smoother flow of the total quantity of gas and permitting fewer holes to be used in the exit of the outer chamber 13. This procedure continues through a sufficient number of chambers until the desired character of flow is obtained.

The gas is normally prevented from entering the end 31 through the shell 12 by means of a valve 20 positioned in the shell 12 opposite the end 11. When it is desired to pass the gas directly through the silencer without muffling it, the valve 20 may be opened, whereupon the gas may flow directly into the end 31, from which it may escape through the louvres 27 provided in the suction surface thereof. A baffle 50 such as is provided in the end 11 is provided in the end 31 for better directing the flow of gas out of the louvres 27 when the valve 20 is open. The exhaust line connection 22 in the end 11 is preferably provided with slots 23 and a groove 24 so that it may yield when the exhaust pipe 25, having a cooperating circumferential groove 40 is pushed inside of it, until the grooves 24 and 40 match. A sufficient number of single turns of piano wire 51 drawn taut by twisting the ends of each turn provides a secure fastening. The struts 28 secured to the outer portions 11 and 31 by the flanges 29 secure the airfoil section silencer to the fuselage of the airplane.

In the modified form of construction such as that shown in Figs. 2 and 9 to 11 inclusive, I make provision for the gas to enter at the center of the main body instead of at one end as above described. In Fig. 2 the silencer is shown secured above the wings of an airplane by the streamlined struts 35 in somewhat the same manner as previously described and so that the section will not influence or be influenced by the action of the main wing of the airplane on the air. The main body 31' with laterally outwardly extending streamlined members 32 is similar in type to the previously described construction. The inner shell 33 and the outer shells 34 are assembled by means of the inwardly flanged end heads 39 in the same manner as in the previously described construction. The inner shell 33 and the outer shells 34 are similar in construction to the previously described construction, the only difference being that the inner shell 33 is not provided with holes completely around the circumference and the gas flows from the outside inwardly and is emitted from the ends of the inner shell 33. This construction may also be secured to an airplane by the struts 35 in the same manner as that shown in Fig. 1.

In the center of the main body 31' an exhaust line connection 36 similar to that shown in the preferred construction is provided to receive the exhaust gas from the engine. In the outer streamlined portions 32 louvres 37 are provided to allow the gases to escape from the inner chamber 33 after they have been silenced. The advantage of this type of construction is that the exhaust gas from the engine enters the outer chamber at the center and issues from the inner chamber at the ends, thereby permitting the exhaust pipe to be directed centrally to the silencer avoiding sideward bends in the exhaust pipe or offsetting the silencer. A pronounced cooling effect results from using the outer chamber as a primary chamber, thereby reducing the volume of the exhaust gas and resulting in lessened back pressure.

The same system of changing the character of the flow of gas is used as was previously described. The cutout valve is not a part of this design but should one be required it can be mounted on the exhaust pipe just ahead of the silencer, as is usual in automobile practice and due to the thickness of the airfoil section of the silencer it is doubtful whether such a valve would exhibit parasitic resistance.

In another form of silencer construction shown in Figs. 12 to 15 inclusive, I have provided a silencer somewhat similar in section to the previously described constructions and that will fit into the leading edge of the wing 90 of an airplane. The exhaust connection 40 is designed the same as in the previously designed constructions and is connected to the central portion of the body 41 of the silencer and leads into the central shell 42. The outer shells 43 surround the inner shell 42 in somewhat the same manner as in the previously described constructions. The assembly of the inner chamber 42 and the outer chambers 43 to the inwardly extending flanged end head 44 is also similar to the constructions previously described, except that the ends of the shell 42 are enclosed by plate members 53. Louvres 45 are provided in the back portion of the main body 41 where the suction effect occurs to allow the escape of the gases after reaching the outer chamber. Apertures 47 are provided in the inner shell 42 and the outer shells 43 to allow the same relative flow of gases as has been previously described in order to decrease the rate of flow of the gas.

The advantage of this type of construction is that it can be assembled in the wing of an airplane and is preferably detachably connected thereto as by screws 51. Since the silencer is of airfoil section and forms an integral part of the main wing, there will be negligible resistance resulting from this installation.

A modification of this last described construction is shown in Fig. 16 in which a wing 70 is shown having a muffler mounted therein between the leading and trailing edge thereof, and having its upper surface flush with and conforming in shape to the upper surface of the wing. The muffler may comprise an outer shell 71, and inner shells 72, 73 and 74 apertured and arranged in a manner similar to the shells 42 and 43 of the construction shown in Fig. 14. The outer shell 71 is provided with louvres 74 similar to the louvre 45 shown in Fig. 14 to permit the escape of the gases from the silencer. The connection 76 for conducting the exhaust gases from the engine to the inner shell 72 may be extended downwardly and forwardly through the wing, as shown, or in any other manner found most suitable for the particular installation.

This construction may be found more satisfactory than the previously described construction, particularly where the wing is of that type where the maximum degree of suction over the wing is found at a material distance rearwardly of the leading edge, it being understood that the silencer is preferably so placed that the louvres 75 are in the area of maximum suction over the wing. It is likewise understood that in this construction, as in the previously described construction, the muffler is preferably insertible and removable from the wing as a unit, and when in place is removably secured therein. It is also to be understood that the upper surface of the shell 71 cooperates with the wing to complete the unbroken continuity and streamlining of the upper surface thereof which would otherwise be broken by the recess in which the silencer is received.

It will moreover be seen that in all illustrated forms of the novel airfoil muffler, the outer shell or chamber members are increasingly flattened in a vertical plane transverse to their longitudinal axes; and all said chamber members are disposed with their axes substantially parallel with the axis of the airfoil body member,—said body member having a rounded leading edge and the carrying of the inlet connection through this leading edge to the inner shell being ordinarily advantageous.

It is obvious in these constructions that if the final exit of the exhaust gas is under suction, the method used of changing the character of flow between the entrance and exit of the silencer will cause no change to occur in the silencing action but will allow the suction on the exit side to accelerate the work within the silencer, thus reducing the back pressure. It will also be understood that in the first two modifications the silencers are preferably positioned with a positive angle of incidence during normal flight so that the lifting effect on the airplane produced by them constitute an increment of the total lifting effort on the entire plane.

The first two described constructions may be placed in any suitable location on an aircraft and when placed at proper incidence will share in the work of lifting thereby causing the extra load caused by the weight of the muffler to be reduced to a negligible amount. It is obvious that the only parasitic resistance incurred is that of the hangers or struts which attach the silencer to the craft, and as has been previously described, this is no more than the conventional type of construction. It is well known that a very pronounced suction effect exists on the back of an airfoil at high speeds through the air and this suction effect is utilized in this design to diminish back pressure, as will be apparent from the previous description. The silencing effect is obtained by converting the impulse or wave flow of the exhaust gases into approximately smooth flow.

It will be apparent that this type of construction may be installed on any type of plane and also under a nacelle, as illustrated in Fig. 3, and it is obvious that with this design, engines of any horse power can be silenced without measurably impairing the overall performance of the aircraft on which the silencer is used.

Formal changes may be made in the specific embodiment of the invention described without departing from the spirit or substance of the broad invention, the scope of which is commensurate with the appended claims.

What I claim is:

1. In combination with an airplane and the engine thereof, means for silencing the exhaust from said engine including a silencer of airfoil section supported from said airplane outside the zone of influence of the wings thereof on the surrounding air and connected with said engine, said silencer effecting a lifting effort on said airplane during normal operation of said airplane.

2. In combination with an airplane and the engine thereof, means for silencing the exhaust of said engine including a silencer of airfoil section independent of the main lifting surfaces of said airplane and positioned to effect a lifting effort on said airplane, said silencer being positioned outside of the normal zone of influence of said surfaces on the surrounding air and being connected to said engine to receive exhaust gases therefrom.

3. In combination with an airplane and the engine thereof, means for silencing the exhaust of said engine including a silencer of airfoil section connected with said engine, said silencer being supported from said airplane in a position to effect a lifting effort thereon and being positioned outside of the zone of influence of the main supporting surfaces of said airplane on the surrounding air.

4. In combination with an airplane and the engine thereof, means for silencing the exhaust of said engine including a silencer connected with said engine and of a section representing at least part of an airfoil section, said silencer being positioned in the normal flow of air relative to said airplane whereby to serve as an increment of the total lifting surface of said airplane and outside of the normal zone of substantial influence of the wings of said airplane on the surrounding air.

5. In combination with an airplane and the engine thereof, an airfoil supported from said airplane outside of the normal zone of influence of the wings thereof on the surrounding air and serving as an increment of the total lifting surface of said airplane, said airfoil being formed to receive exhaust gases from said engine and to silence said gases.

6. In combination with an airplane having main wings, and the engine thereof, a relatively small airfoil positioned in vertically spaced relation with respect to said main wings and outside of the zone of influence thereof on the surrounding air, said airfoil being formed to provide a silencer for said engine, and means connecting said airfoil and said engine.

7. In a muffler, in combination, a main body of airfoil section provided with a gas outlet, a plurality of shells one within the other within said main body for muffling gases, a cut-out valve within the inner of said shells, and outer streamlined ends on said main body, one of said ends having an inlet for delivering gas to said inner shell and the other of said ends having apertures for the direct escape of said gases from said inner shell when said cut-out valve is open.

8. In a muffler, in combination, a main body of airfoil section provided with apertures on the suction side thereof, an inner shell provided with apertures around the circumference thereof, outer shells provided with apertures in one side thereof surrounding said inner shell, a valve normally closing one end of said inner shell, a flanged member receiving the ends of said outer and inner shells, outer streamlined ends on said main body, one of said ends having an inlet for gases and the other end having apertures for the gas to escape therefrom when said valve is opened to permit gases to flow directly between said ends.

9. In a muffler, in combination, a main body of airfoil section having an inlet for gases, outer streamlined ends on said main body provided with outlets for said gases, an inner shell positioned longitudinally of said main body and having apertures in one side thereof, said inner shell providing an outlet for said gases from said main body to said ends, outer shells within said main body surrounding said inner shell, said outer shells having apertures therein, and flanged members fitting into said main body and disposed transversely to said inner and outer shells receiving the ends of said outer and inner shells and closing said ends against the direct flow of gas thereto from said main body outside of said outer shells.

10. In a muffler, in combination, a main body of airfoil section, said main body having a centrally located inlet for exhaust gases, outer streamlined ends on said main body, said ends having outlets for said gases, an inner shell positioned longitudinally of said main body for providing an outlet for said gases, from said main body to said outer ends, and a plurality of shells surrounding said inner shell, said inner and outer shells having apertures provided partly around their circumferences and positioned with said apertures in opposite relation to the apertures in the next adjacent shell.

11. In a muffler, in combination, a main body of airfoil section having a rounded leading edge, said main body having an inlet for gases, outer streamlined ends on said main body provided with an outlet for said gases, and a plurality of shells positioned one within the other within said main body and with their axes substantially parallel with said edge, said shells provided with apertures for providing a path of flow for gases successively from one to another to produce a muffling effect for said gases entering said inlet.

12. In a muffler, in combination, a main body of airfoil section having outlets on the suction side thereof, a circular inner shell provided with apertures about the circumference thereof, outer shells surrounding said inner shells, said outer shells having apertures on one side only and positioned so that said apertures are in opposite relation to the apertures in the next adjacent shell, and outer streamlined ends on said main body, one of said ends having an inlet to said inner shell and the other having apertures for gases to escape therefrom.

13. In a muffler, in combination, a main body of airfoil section, said main body having a rounded leading edge and a centrally located inlet for exhaust gases, outer streamlined ends on said main body, said ends having outlets for said gases, an inner shell in communication with said inlet and positioned with its axis substantially parallel with the leading edge of said main body, said shell providing an outlet for said gases from said main body to said outer ends, and a plurality of outer shells, having substantially parallel axes, surrounding said inner shell, said inner and outer shells having apertures provided partly around their circumferences for the passages of said gases between them.

14. In combination with the wing of an airplane, a muffler including a main body having an inlet for gases, said main body fitting into the leading edge of an airplane wing and provided with outlets for said gases on the suction side of the wing, an inner chamber receiving said gases, and outer chambers surrounding said inner chamber, said inner and outer chambers provided with apertures around one portion of their circumference for the flow of said gases between the inlet and outlet.

15. In a muffler, in combination, a main body having a centrally located inlet for gases, said main body fitting into the leading edge of an airplane wing and being provided with apertures for the escape of said gases, a circular inner shell receiving said gases, and outer shells surrounding said inner shell, said inner and outer shells being provided with apertures partly around the sides thereof for the flow of the gases outwardly therefrom.

16. In combination with the wing of an airplane, a muffler including a main body having a centrally located inlet for gases, said main body fitting in the leading edge of said wing and completing the airfoil section thereof, said main body being provided with apertures for the escape of gases therefrom, an inner shell within said main body for receiving gases, said inner shell having apertures on one side thereof, outer shells surrounding said inner shell, the sides of said outer shells being provided with apertures for the flow of gas outwardly therethrough.

17. In combination with an airplane, a fuselage, wings extending outwardly from said fuselage, an engine, a muffler of airfoil section, said muffler being detachably received in the leading edge of one of said wings, and an exhaust connection between said engine and said muffler.

JOHN SQUIRES.